Fig. 1

Fig. 2Aa  RANGE STATION TRANSMITTER

RANGE STATION TRANSMITTER

Fig. 4

SHIPBOARD RECEIVER-INDICATOR

Fig. 4a

SHIPBOARD RECEIVER-INDICATOR

Fig. 5A — RANGE STATION TRANSMITTER

Fig. 5B — SHIPBOARD RECEIVER-INDICATOR

United States Patent Office

3,422,427
Patented Jan. 14, 1969

3,422,427
ELECTRONIC CHANNEL GUIDANCE SYSTEM
Peter P. Schauffler, 101 W. Springfield Ave.,
Philadelphia, Pa. 19118
Continuation-in-part of application Ser. No. 580,545,
Sept. 19, 1966. This application Feb. 5, 1968, Ser.
No. 709,853
U.S. Cl. 343—6                          14 Claims
Int. Cl. G01s 9/02

ABSTRACT OF THE DISCLOSURE

Channel guidance systems in which electronic equipment on board a vehicle traveling the range receives, in a distinctive time interval for that range, a sequence of signals comprising equal-amplitude beam pulses and time-separated pulses from which there is determined the relative bearing and distance from a range station and the offset of the vehicle from the range center line.

Cross-reference to related applications

This application is a continuation-in-part of my co-pending application Ser. No. 580,545, filed Sept. 19, 1966, now abandoned.

Background of the invention

In my related Letters Patent Nos. 3,270,345 and 3,302,-203 which respectively issued on applications Ser. No. 321,477, filed Nov. 5, 1963 and Ser. No. 420,548, filed Dec. 23, 1964, there are described electronic channel guidance systems in which on-board equipment determines the relative bearing and distance of the vehicle from two fixed stations and indicates the vehicle's progress and offset from the range center line.

Summary of the invention

In accordance with the present invention, each range of the system is equipped with a fixed range station located on an extension of the range center line and having a transmitting antenna which provides two or more narrow beams evenly disposed about said center line. Sustained pulses of equal amplitude are transmitted sequentially or simultaneously with distinctively different modulations. Each sequence of range signals as received on-board a vehicle traveling the range additionally includes a pair of time-separated emitted/reflected pulses, one of which is directed from said range station along the range center line and the other of which is either returned from the vessel back to said range station, by reflection or retransmission, for retransmission back to the vessel or is retransmitted from a second fixed station at the other end of the range back to the vessel. In each of these cases, the shipborne equipment measures the time lapse between the initially transmitted pulse and the subsequently received pulse of the pair to determine the vessel's distance from a range station, compares the relative amplitude of the beam pulses to determine the vessel's angular displacement from the range center line, and combines this distance and angle information to indicate the vessel's lateral offset from such center line.

More specifically, in one embodiment of the present invention, each range in the system has a single range station which is equipped with a fixed transmitter located on the extension of the range center line, with an antenna which provides at least two narrow beams evenly disposed about said center line, and with an attached radar directed along this same center line and operating at a different frequency. The radar-receiver pattern is transmitted to the vessel simultaneously on all beams followed (or preceded) by sustained pulses in the beams and distinguished either by their time sequence or their modulation. The shipborne equipment measures the time-lapse between the transmitted radar pulse and the subsequently (or previously) received vessel-reflection pulse to determine the vessel's distance from the range station, compares the relative amplitude of the beam pulses to determine the vessel's angular displacement from the range center line, and combines such distance and angle information to indicate the vessel's lateral offset from the center line.

In another specific embodiment of the invention which requires but a single range station, the vessel and the range station each has a transponder so to provide the time-spaced pulses used for determination of the vessel's distance from the range station and to provide the distance information which is combined with the bearing information derived from the beam pulses for on-board determination of the lateral offset of the vessel from the range center line.

Other specific embodiments of the invention require a second station at the other end of the range. In one of them, the second range station has a transponder for transmitting to the vessel the second of the time-separated pulses which are used in determining the vessel's distance from the second range station and providing the distance information which is combined with bearing information derived from the beam pulses for on-board determination of the lateral offset of the vessel from the range center line. In another of them, the second range station transmits the first of the time-separated pulses used for distance determination. This first pulse is retransmitted by a transponder at the first station to the vessel as the second of the time-separated pulses. These first and second time-separated pulses are used for determining the vessel's distance from the first range station and as combined with the bearing information also provides for on-board determination of the lateral offset of the vessel from the range center line.

The invention further resides in features of combination and arrangement hereinafter described and claimed.

Brief description of the drawings

For a more detailed understanding of the invention reference is made in the attached description to the drawings in which.

Figure 1:
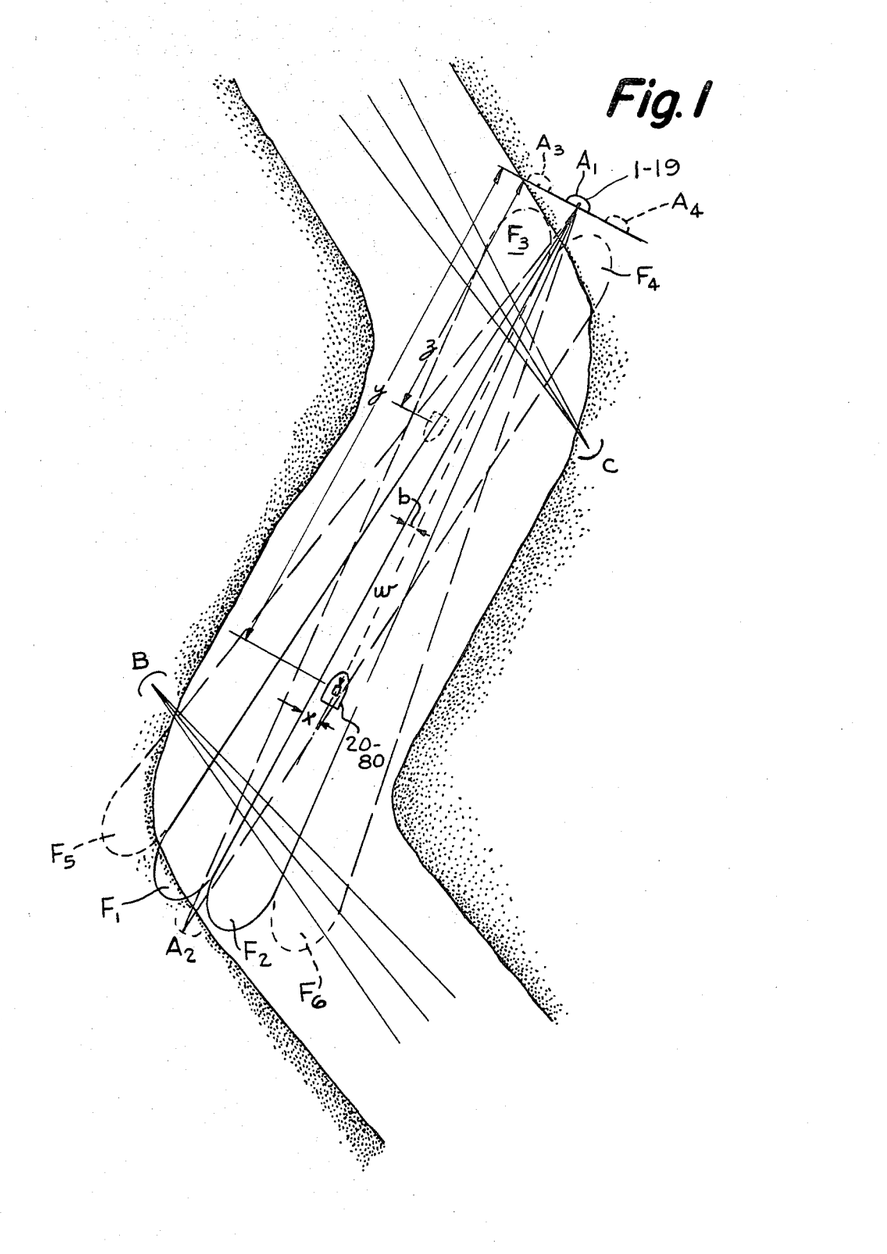
FIG. 1 is an explanatory figure referred to in discussion of the geometric relationships between vessel location and range-station locations for a typical channel.

Referring to FIG. 1, the position of a vessel's receiver-indicator 20–80 is determined by rectangular coordinates consisting of (1) the vessel's distance $y$ from the range station 1–19, measured along the range center line $A_1$, $A_2$, and (2) its lateral offset $x$ from this center line. For the typical channel configuration, in which the angle $b$ between the range center line and direct range station-vessel line is small, this offset can be closely approximated as the product of the vessel's direct distance $w$ from the range station and its angular displacement $b$ from the range center line.

In this system, the range station-vessel distance $w$ is determined by transmitting to the vessel, as part of the position pulse sequence during the time segment for that range station, the receiver pattern from a separate-frequency narrow-beam radar attached to the range station and measuring aboard the vessel the time interval between the radar transmitter pulse and identified vessel reflection; the displacement angle $b$ is determined aboard the vessel by comparing the received amplitude of consecutive sustained pulses in the beams $F_1$, $F_2$ from the range station; and the vessel's lateral offset $x$ from the range center line is determined by multiplying the above distance and displacement angle information. The transmission time segments for all range stations in the system are time-separated by sequenced delay circuits which are triggered by a common synchronizing pulse which activates each range station in turn in any preselected order.

Referring next to FIGS. 2A, 2B, 3, 4, 5A and 5B as illustrative of suitable means by which this method can be performed, the fixed station for each range consists of a radio transmitter and related equipment 1–19 located on a tower (an existing range light tower where available) on land or in shallow water along the extension of the range center line $A_1$, $A_2$ (FIG. 1). The dual-feed antenna provides an electronically-sequenced pair of beams $F_1$, $F_2$ evenly disposed about the channel center line; and the system frequency and antenna size are selected to make these beams narrow.

The allotment of the appropriate time segment for each range can be accomplished by a monostable multivibrator 5 (FIGS. 2A, 3 and 5A) which is triggered, through a small auxiliary antenna 1, detector 2 and amplifiers 3, 4 by a system-wide synchronizing pulse $G_1$, $H_1$ (of, say, 2 microseconds). The output of this range selector multivibrator 5 is a positive gate $J_1$ which provides the required delay $T_0$–$T_1$ between the system-wide synchronizing pulse $T_0$ and the commencement of the time segment $T_1$–$T_2$ assigned to that particular range.

The signal emitted by each range station during its allotted time segment consists initially of distance information carried simultaneously by both means and thereafter of angle information carried by the two beams in sequence.

The distance information can be provided by a small radar transmitter-receiver 10, 11 (see Chapter 1, Section 1.6 of Introduction to Radar Systems by Merrill I. Skolnick, McGraw-Hill, New York, 1962), with antenna 12 and frequency selected to provide a narrow beam oriented along the range center line and to avoid interference with the beam-system frequency. The receiver pattern from this radar $M_1$ is put through a diode to the screen grid of an amplifier and switch 14, the control grid input for which is provided by an oscillator 13 at the beam system frequency; and the output of this amplifier $Q_1$ is the input to a transmitter tube 15.

The division of the range's time segment between intervals for distance and angle information transmission (hereinafter referred to as the "distance interval" and "angle interval," respectively) can be accomplished by a pair of monostable multivibrators 6, 7. The first of these distance-angle-separator multivibrators 6 is triggered by the trailing edge $T_1$ of the positive gate $J_1$ from the range selector multivibrator 5 and provides a positive gate $K_1$ of suitable length (say 100 microseconds) to accommodate the longest radar-return pattern in the system. This gate is put through a differentiator circuit 9 to provide the firing pulse $L_1$ for the radar transmitter 10. The full gate $K_1$ is also applied directly to the radar receiver 11 to activate it for the distance interval $T_1$–$T_2$.

The trailing edge of the distance-interval gate $K_1$ is also the trigger for the second distance-angle-separator multivibrator 7 which provides a positive gate $P_1$ of suitable length (say 100 microseconds) to permit angular displacement determinations by vessels on the range.

This gate $P_1$, passed through a diode, is a further input to the screen grid of the oscillator amplifier and switch 14, so that the transmitter 15 is activated continuously during the angle interval $T_2$–$T_3$.

The separation of this angle-interval transmission into the left and right beams of the antenna 19a, 19b is accomplished by another pair of monostable multivibrators 16, 17. The first of these beam-separator multivibrators 16 is triggered by the leading edge of gate $P_1$ from the second distance-angle-separator multivibrator 7 and provides a negative gate $R_1$ (say 50 microseconds equal to half the angle-interval gate $T_2$–$T_3$. This beam-separator gate is applied to an electronic switch 18b which deactivates one feed 19b of the antenna for the first half $T_2$–$T_{2\frac{1}{2}}$ of the angle-interval. The second beam-separator multivibrator 17, triggered by the trailing edge of the gate $R_1$ from the first multivibrator 16, provides a negative gate $S_1$ of equal length which is applied to a second electronic switch 18a and deactivates the other feed 19a of the antenna for the second half $T_{2\frac{1}{2}}$–$T_3$ of the angle interval.

The resulting antenna output $V_{1a}$–$V_{1b}$ consists of distance information (the range-station radar-reflection-pattern) transmitted simultaneously on both beams during the distance interval $T_1$–$T_2$ and angle information (two sustained pulses of equal amplitude) transmitted consecutively on one beam and then the other during the angle interval $T_2$–$T_3$.

The isolation of each range station transmitter in the system and elimination of nonrelevant signals from neighboring ranges can be accomplished by a monostable multivibrator 8 which is triggered by the trailing edges $T_0+2$ of the synchronizing pulse $H_1$ from the second amplifier 4 in the receiver circuit and which provides a negative gate $I_1$ to deactivate the first amplifier 3 for the remainder of the system cycle—until just (say 10 microseconds) before the beginning $T_0$ of the next allotted time segment for that range.

The synchronizing pulse can be relayed to the next station in the system simply by applying the output $H_1$ of the second amplifier 4 as a further input (through a diode) to the screen grid of the amplifier and switch 14. Using a small supplementary antenna if the position of the next range station requires it, the synchronizing pulse $T_0$ (say 2 microseconds) will then be retransmitted at the beginning of the system cycle, picked up by the auxiliary antenna of the next range station (to activate it for its allotted time segment) and passed on simultaneously to the next succeeding station in the system.

The receiver-indicator aboard each vessel (FIGS. 2B, 4 and 5B) can be portable and consists of equipment 20–80 designed to present continuously the distance and angular displacement information received from the range-station transmitter and the product of this information—representing the vessel's offset from the range center line—together with the position of other traffic on the range.

The receiver antenna 20 is a small stub or horn, located on the vessel's radar mast or left bridge wing if desirable to avoid signal-path obstructions, and connected into a detector 21 and amplifiers 22, 23 with a long-time-constant automatic gain control 24.

The selection of the appropriate time segment for the range being traveled can be accomplished by a monostable multivibrator 31; triggered by the system-wide synchronizing pulse $T_0$ in the output $H_2$ from the second amplifier 23. The output of this range selector multivibrator 31 is a positive gate $J_2$ which provides the required delay $T_0$–$T_{1\text{-}10}$ between the synchronizing pulse $T_0$ and a point just (say 10 microseconds) before the commencement of the desired time segment $T_1$–$T_3$. Through a range selector switch 33, which changes the grid resistor setting in the multivibrator 31, this gate $J_2$ can be varied to pick out the time segment for any range in the system. (To avoid premature triggering of receiver-indicators during the threshold period (say 10 microseconds), the time segments should be distributed throughout the system in such a way that consecutive segments are not assigned to neighboring ranges.)

The signal $G_2$ received during the allotted time segment for each range consists of the combined antenna output $V_{1a}$, $V_{1b}$ described above for the range-station transmitter.

The distance and angle information is separated in the shipboard receiver-indicator by a double multivibrator circuit 41, 42 similar in principle to the distance-angle-separator multivibrators 6, 7 described above in the range-station circuit.

The first of these multivibrators 41, triggered by the trailing edge of the positive gate $J_2$ from the range selector multivibrator 31, provides a positive distance-interval gate $K_2$ (say 110 microseconds) to activate an electronic switch 51 which applies the received distance pattern from the final amplifier 23 through a diode to the electron gun of a small cathode-ray tube (CRT) 52. This same distance gate $K_2$ activates a sweep generator circuit 56 which applies a sawtooth waveform $L_2$ inversely to the CRT vertical plates. The result is a CRT display of objects, including other vessels, along the range—the spacing of bright spots on the vertical line being proportional to the distance of these respective targets from the range station.

The identification of the navigator's own vessel in this CRT display can be achieved by a monostable multivibrator 54, triggered by the transmitter pulse $T_1$ in the output $M_2$ from the distance switch 51. This distance-generator multivibrator 54 has a variable grid resistor actuated by a small motor and cutch 53. The clutch position for this motor is set at the beginning of the range to coincide with the vessel's position as indicated by the identifiable beginning-of-the-range target on the CRT. The output of this multivibrator 54, consisting of a variable negative gate $N_2$, is passed through a differentiator circuit 55 and applied as a variable positive pulse $O_2$ through a diode to the electron gun of the CRT 52 to produce an augmented spot which clearly marks the navigator's own vessel $T_y$ on the CRT vertical display for identification of its distance from the range station and its relationship to other traffic on the range.

The continuous synchronizing of the variable pulse $O_2$ produced by the distance-generator differentiator 55 and the "own vessel" target pulse $T_y$ received from the range station can be achieved by connecting the distance motor 53 into the plate circuit of a pentode 57 with the outputs of the distance switch 51 and distance-generator differentiator 55 applied to the control and screen grids, respectively. For vessel movement toward the range station, the trailing edge of the variable pulse $O_2$ will be locked to the leading edge of the "own vessel" target pulse $T_y$, advancing in small steps by the energizing of the distance motor 53 through the firing of the pentode once each cycle as the "own vessel" target pulse $T_y$ moves toward the range station. For vessel movement away from the range station, the leading edge of the variable pulse $O_2$ will be locked to the trailing edge of the "own vessel" target pulse $T_y$ through the same incremental energizing of the distance motor 53. (The difference in distance determination for the two directions of movement, represented by the width of the "own vessel" target pulse $T_y$, can be eliminated by an automatic compensating correction in the clutch connected to the distance motor 53, based on the direction of movement.)

This CRT display provides a picture not only of the longitudinal position and movement of the receiving vessel $T_y$, but also of the longitudinal position and movement of other traffic $T_z$ on the range, thus giving the navigator continuous advance information on the development of all passing situations. As the vessel approaches the end of a range, the navigator can shift ahead momentarily to the next range and inform himself on the position of any traffic which he will be encountering on this next range.

Figure 2:
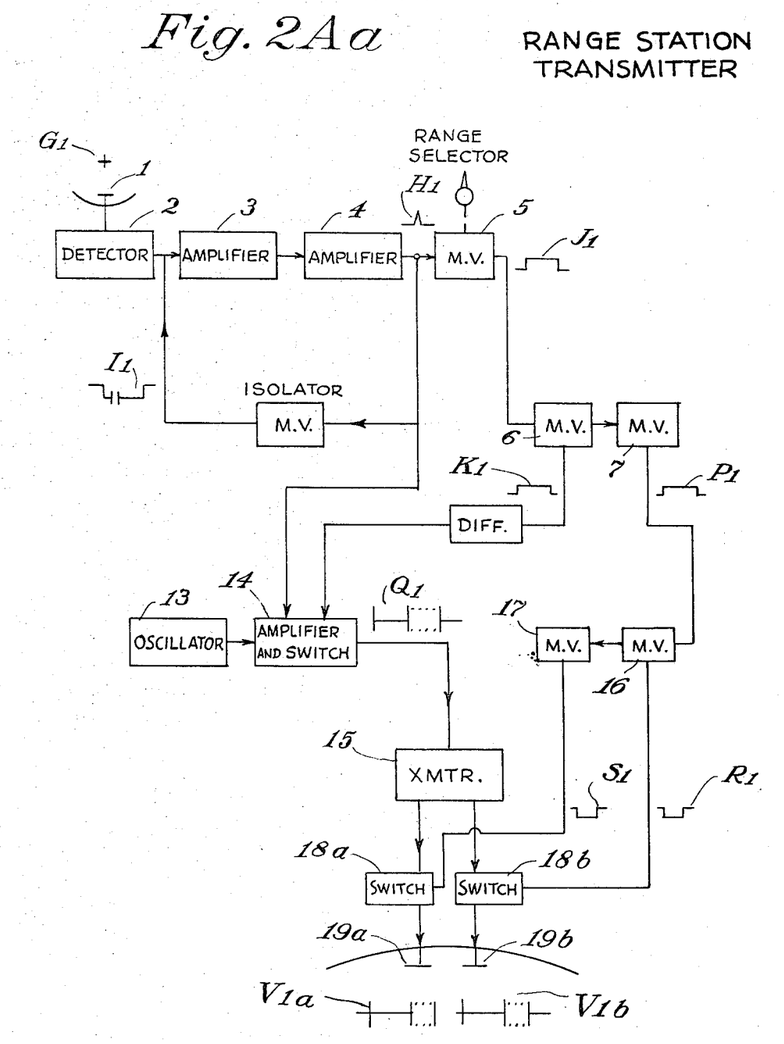
Figure 2A:
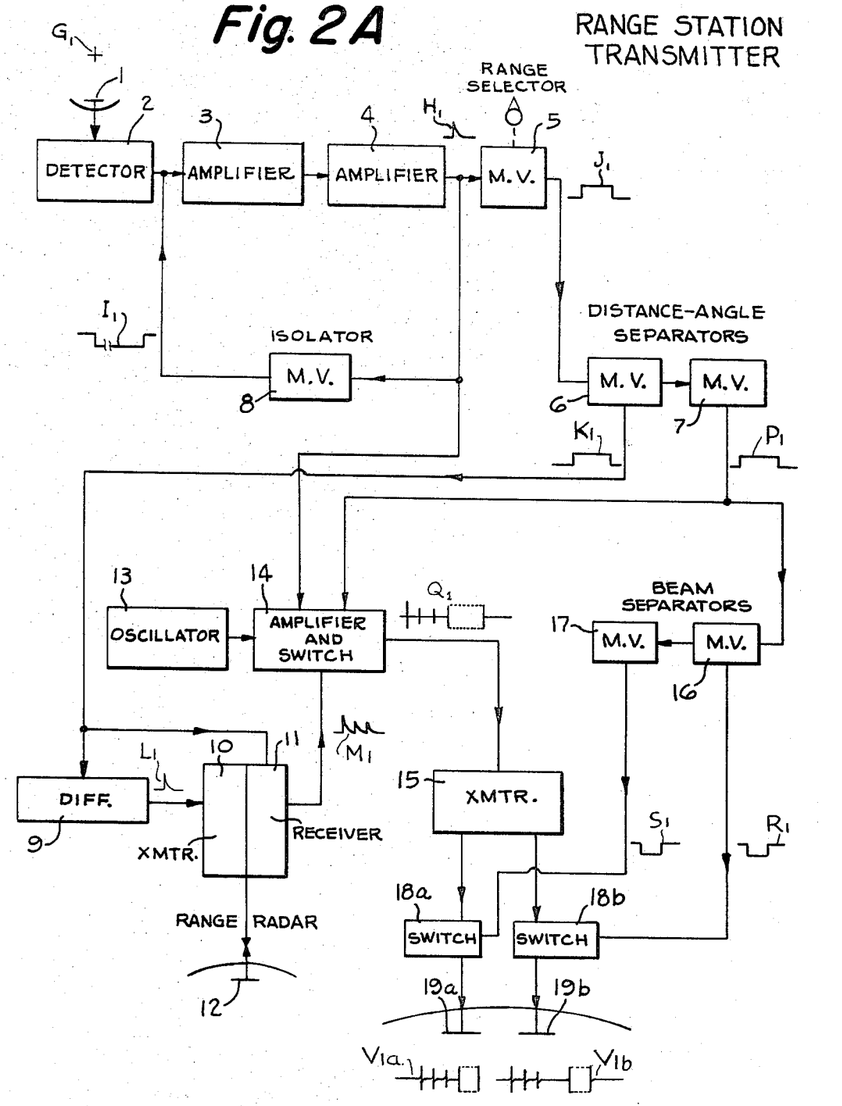
FIGS. 2A and 2Aa are block diagrams showing the principal components of two forms of range-station transmitters.
Figure 2B:
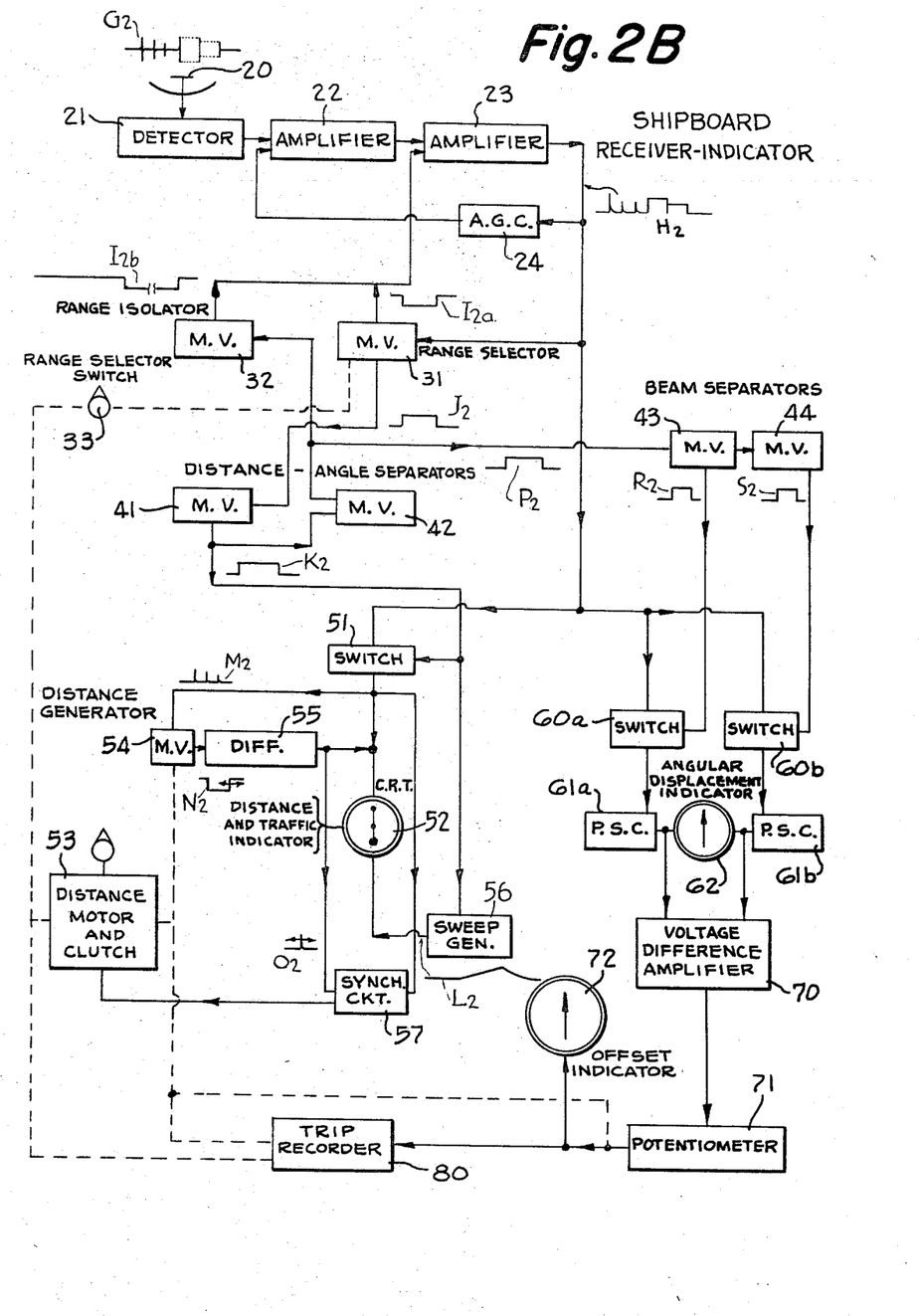
FIGS. 2B and 2Ba are block diagrams showing the principal components of two forms of shipboard receiver.

As a supplement or substitute for the "own vessel" and other traffic display on the CRT 52, a Veeder-Root counter 52a can be connected to the distance motor and clutch 533 for a numerical display of distance derived from the received radar-reflection pattern (FIGS. 2Ba and 4a). If the CRT display is omitted, the CRT 52, sweep generator 56, and their input diodes (FIGS. 2B and 4) can be deleted (see FIGS. 2Ba and 4a). To confirm continuously the operation of the synchronizing circuit 57, a small indicator light 57a can be connected into the cathode line. This arrangement even without the CRT display, makes it possible for the navigator to determine the presence and position of other traffic on the range whenever he so desires by "sweeping" the range manually with the distance clutch 53 and noting the counter reading for all flashes of the synchronizing light 57a.

Figure 4:
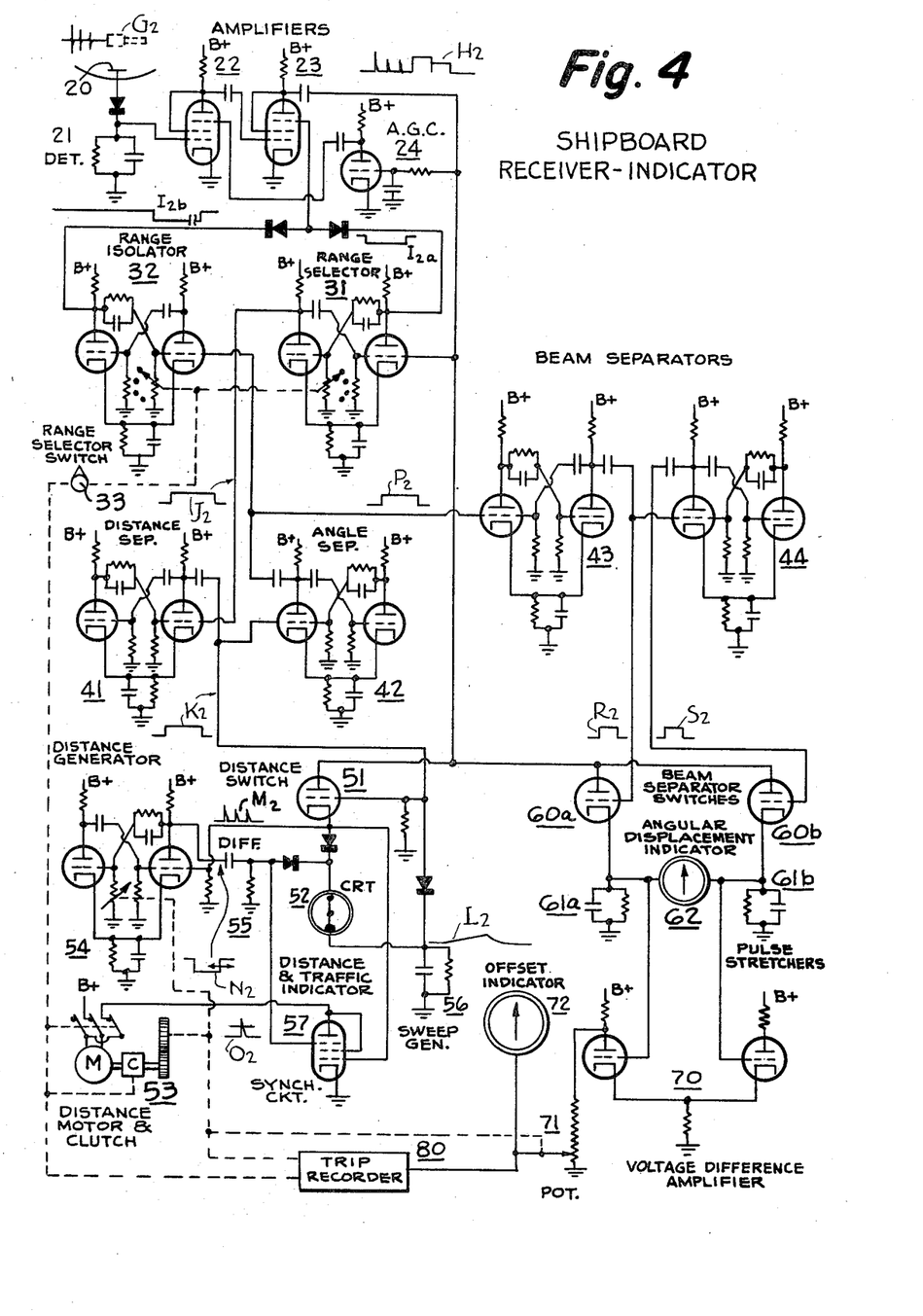
FIGS. 4 and 4a schematically illustrate suitable circuit elements of the shipboard receivers of FIGS. 2B and 2Ba respectively.
Figure 4A:
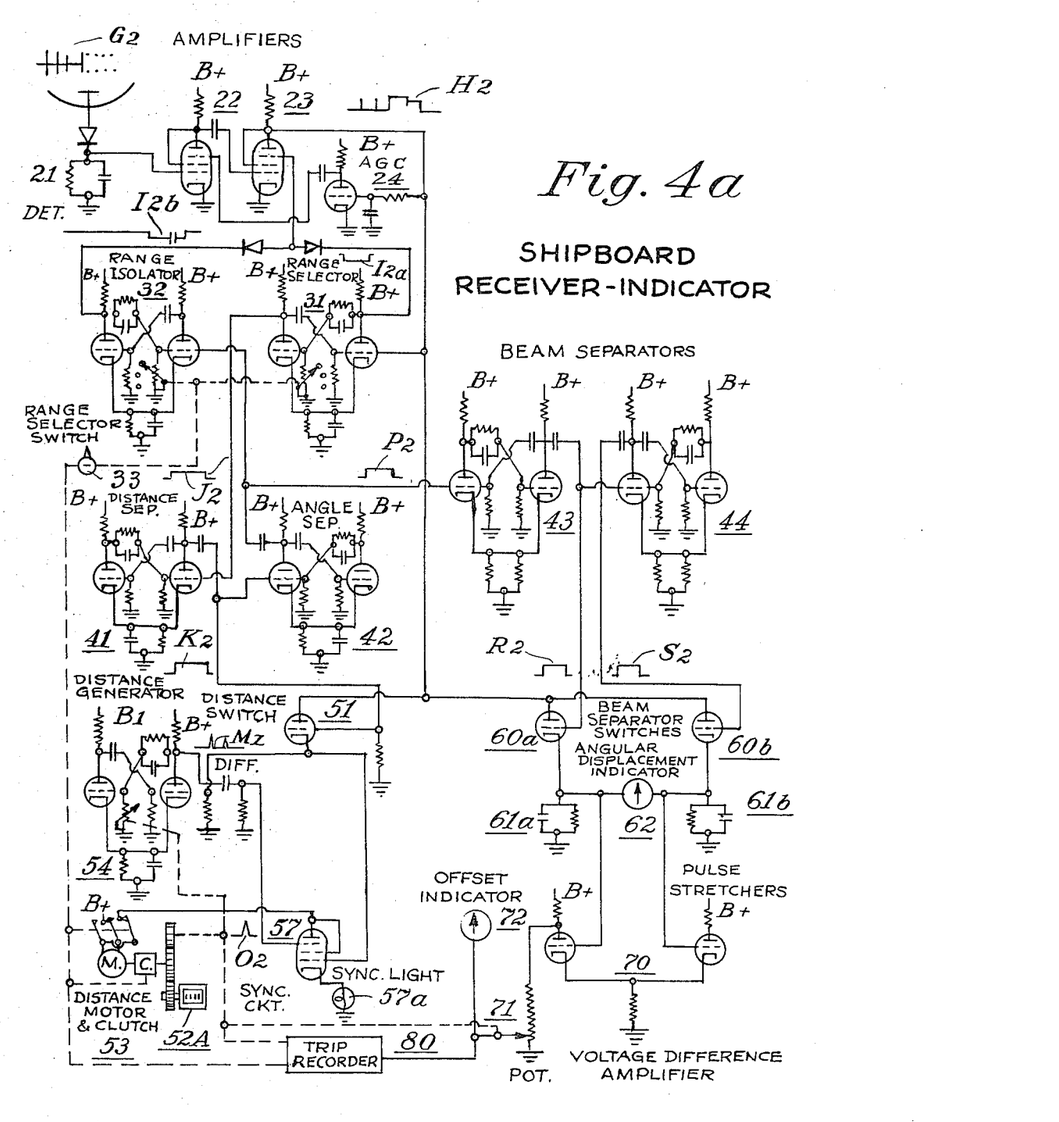
Figure 5A:
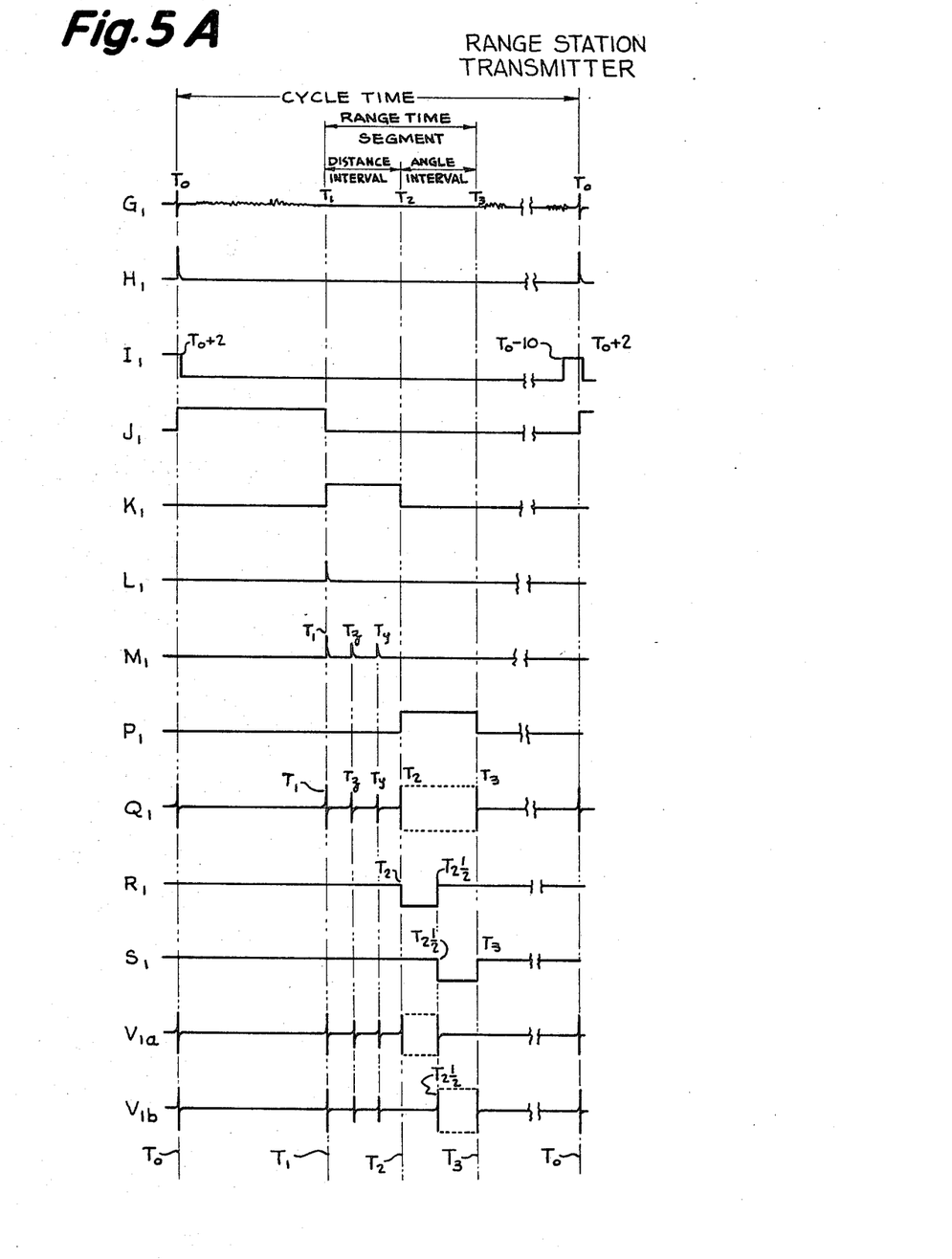
FIG. 5A is an explanatory figure referred to in discussion of the waveforms and timing relationships involved in FIGS. 2A and 3.
Figure 5B:
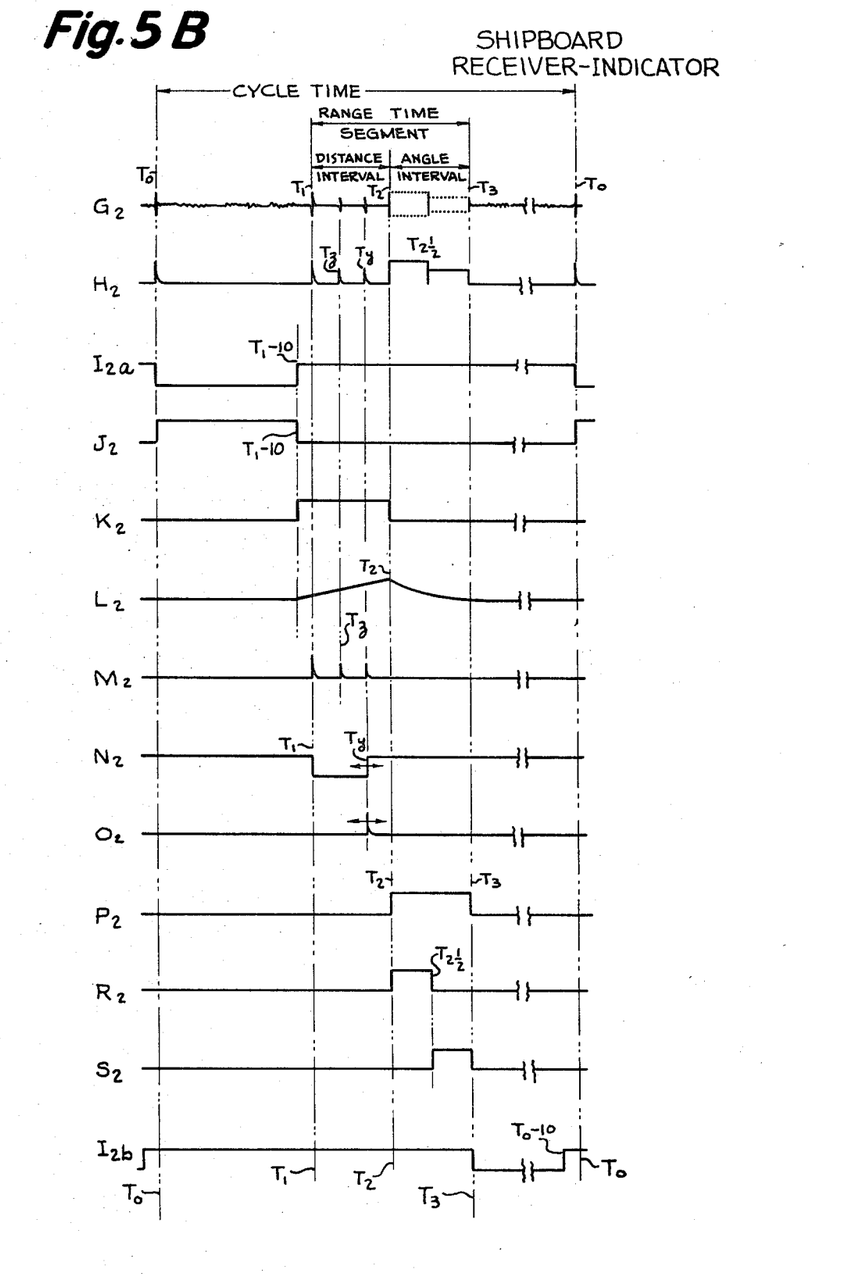
FIG. 5B is an explanatory figure referred to in discussion of the waveforms and timing relationships involved in FIGS. 2B and 4.

Returning to the receiver-indicator arrangement set forth in FIGS. 2B and 4, the second distance-angle-separator multivibrator 42 is triggered by the trailing edge of the gate $K_2$ from the first multivibrator 41 and provides a positive gate $P_2$ (say 100 microseconds) for the angle interval $T_2$–$T_3$. The leading edge of this gate is the trigger for another double multivibrator circuit 43, 44 similar to the beam-separator multivibrators 16, 17 described above in the range-station transmitter circuit. The positive-pulse outputs $R_2$, $S_2$ of these multivibrators 43, 44 divide the angle interval $T_2$–$T_3$ into halves $T_2$–$T_{2\ 1/2}$ and $T_{2\ 1/2}$–$T_3$ (say 50 microseconds each) and respectively activate two electronic switches 60a, 60b which connect the output of the final amplifier 23 into two pulse-stretching circuits 61a, 61b in a sequence synchronized with the angle-interval pulse sequence $T_2$–$T_{2\ 1/2}$ and $T_{2\ 1/2}$–$T_3$ from the range-station transmitter. The voltages developed in these pulse-stretching circuits 61a, 61b thus reflect the relative amplitude, at the shipboard antenna, of the consecutive beam signals received during the angle interval $T_2$–$T_3$, and these voltages can be applied to an appropriately calibrated angular displacement meter 62.

The final key navigational information is the vessel's lateral offset $x$ from the range center line $A_1$, $A_2$ (FIG. 1); and this can be obtained by multiplying appropriate outputs from the distance and angle circuits.

An angle voltage can be obtained by connecting the terminals of the angular displacement meter 62 (FIGS. 2B and 4) into a voltage difference amplifier 70, producing a voltage which represents the algebraic difference between the consecutive angle-interval pulse amplitudes. This voltage can be the input to a potentiometer 71, with the takeoff coupled to the motor and clutch 533 in the distance circuit; and this takeoff voltage can be applied to an appropriately calibrated offset meter 72 to indicate continuously the vessel's lateral removal from the range center line.

The isolation of the signal for the desired range time segment and elimination of nonrelevant signals from other ranges in the system can be accomplished by negative gates $1_{2a}$, $1_{2b}$ from the range selector multivibrator 331 and from an isolator multivibrator 32 also coupled to the range selector switch 33. The negative gate $1_{2a}$ from the range selector multivibrator 31 can deactivate the second amplifier 23 in the receiver circuit during the period from the synchronizing pulse $T_0$ to a point just (say 10 microseconds) before the commencement of the desired range time segment $T_1$–$T_3$; and the negative gate $1_{2b}$ from the isolator multivibrator 332, triggered by the trailing edge of the angle-interval gate $P_2$ from the second distance-angle-separator multivibrator 42, can deactivate this same amplifier 23 during the period from the end of the desired range time segment $T_1$–$T_3$ to a point just (say 10 microseconds) before the commencement $T_0$ of the next cycle.

Figure 3:
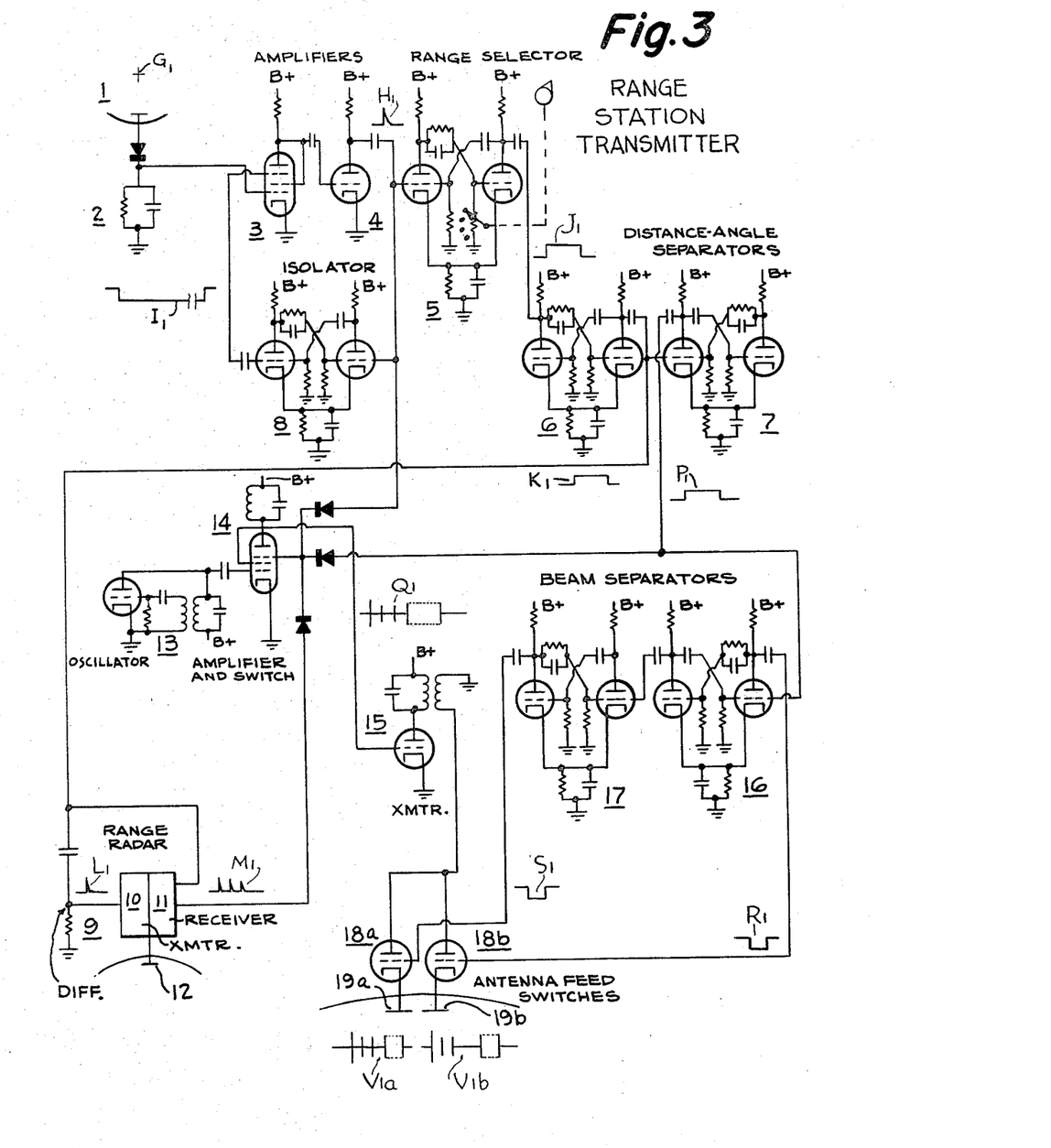
FIGS. 3 and 3a schematically illustrate suitable circuit elements of the range-station transmitters of FIGS. 2A and 2Aa respectively.
Figure 3A:
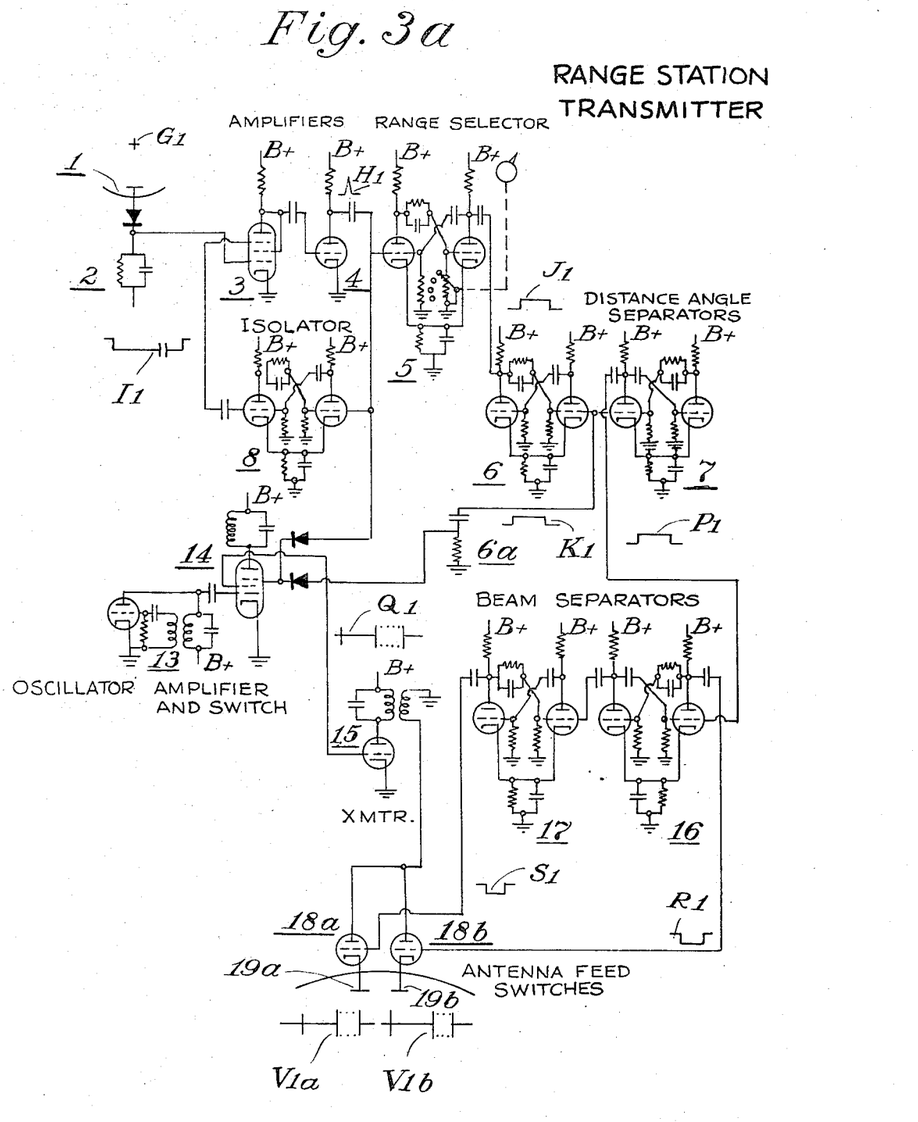

As shown in FIGS. 3 and 4, conventional radio elements may be used in the component circuits of the system shown in FIGS. 2A, 2B described above. The system can be operated very effectively at a microwave frequency however, simply by replacing these elements with equivalent mirrowave components where appropriate.

In the foregoing description, the angle pulses $T_2$–$T_{2\ 1/2}$, $T_{2\ 1/2}$–$T_3$ (FIGS. 5A, 5B) are distinguished by time sequence. If desired, however, this distinction can be achieved by rifferent modulation of simultaneous angle pulses.

This system can readily achieve continuous distance and offset determinations with an accuracy of plus or minus 25 yards and 5 yards, respectively, in the typical channel range. To cover ranges longer than the line-of-sight distance from the range tower to vessel antenna, to obtain higher accuracy, or to permit greater flexibility in vessel movement away from the range center line, an additional transmitter $A_2$ with opposing beams $F_3$, $F_4$ can be furnished at the other end of the range, additional beams $F_5$, $F_6$ can be provided on either side of the range center line by the use of properly-sequenced or distinctively modulated supplementary antenna feeds, or separate range stations $A_3$, $A_4$ can be installed for the inbound and outbound lanes range (FIG. 1).

The equipment above described can be expanded by various elements which further increase its usefulness to the navigator. For example, the receiver pattern $M_1$ from the range-station transmitter can include a mark indicating the far end of the range, and the CRT sweep generator 56 in the shipboard receiver indicator can be arranged to provide full-scope presentation for various range lengths; warning buzzers and/or lights can be incorporated in the offset circuit 72 (to notify the navigator if the vessel moves to either side of the established lane line) and in the distance circuit (to inform the navigator when to make the transition to the next range); the successive beginning-of-the-range settings of the distanceo-motor clutch 53 can be accomplished by a cam on the range selector switch 33 with sequential positions for the consecutive ranges in the system; the radar transmission at each range station can be shifted sequentially between two beams evenly disposed about the range center line and the reflection pattern for the two beams received aboard the vessel can be presented on two adjacent vertical sweeps on the cathode ray tube 52 to indicate the general lateral disposition of traffic on the range; and the distance and offset information and range identification aboard the vessel can be fed and coupled into a trip-recorder 80 to maintain automatically a permanent log of the vessel's position at all times during transit of a channel.

To emphasize common characteristics of the system above described and the system described heretofore in my Letters Patent No. 3,302,203, the above circuits can readily be adapted to work with either of the distance-determination principles set forth in that patent.

Adaptation to the principle of distance determination by means of fore and aft shore stations as described in my above-mentioned patent can be simply accomplished as follows: referring to FIGS. 1, 2A, 2Aa, 3, 3a and 5A:

(1) The range radar unit 9–12 in the range station transmitter is deleted and the output of the first distance-angle separator multivibrator 6 is connected through a differentiation circuit 6a and diode to the amplifier-switch 14 (FIGS. 2Aa and 3a), thus providing a short transmitter pulse at the beginning $T_1$ of the distance interval $T_1$–$T_2$ in the time segment for that range (FIG. 5A); and (2) A range station transponder is provided at position $A_2$ (FIG. 1) on the channel center line at the other end of the range.

Figure 6:
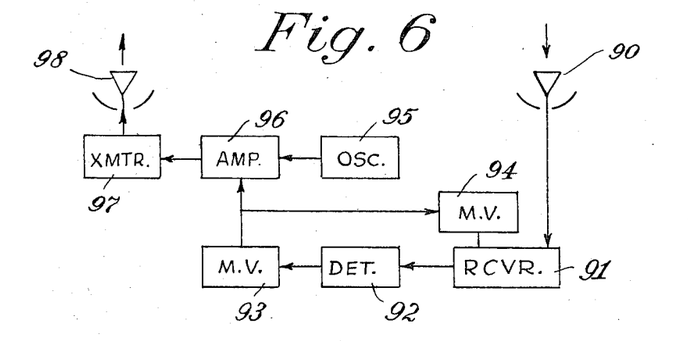
FIGS. 6 and 7 are respectively block and schematic diagrams of a transponder for use with the range transmitter of FIGS. 2Aa, 3a and the shipboard receiver of FIGS. 2Ba, 4a in another modification of the invention.
Figure 7:
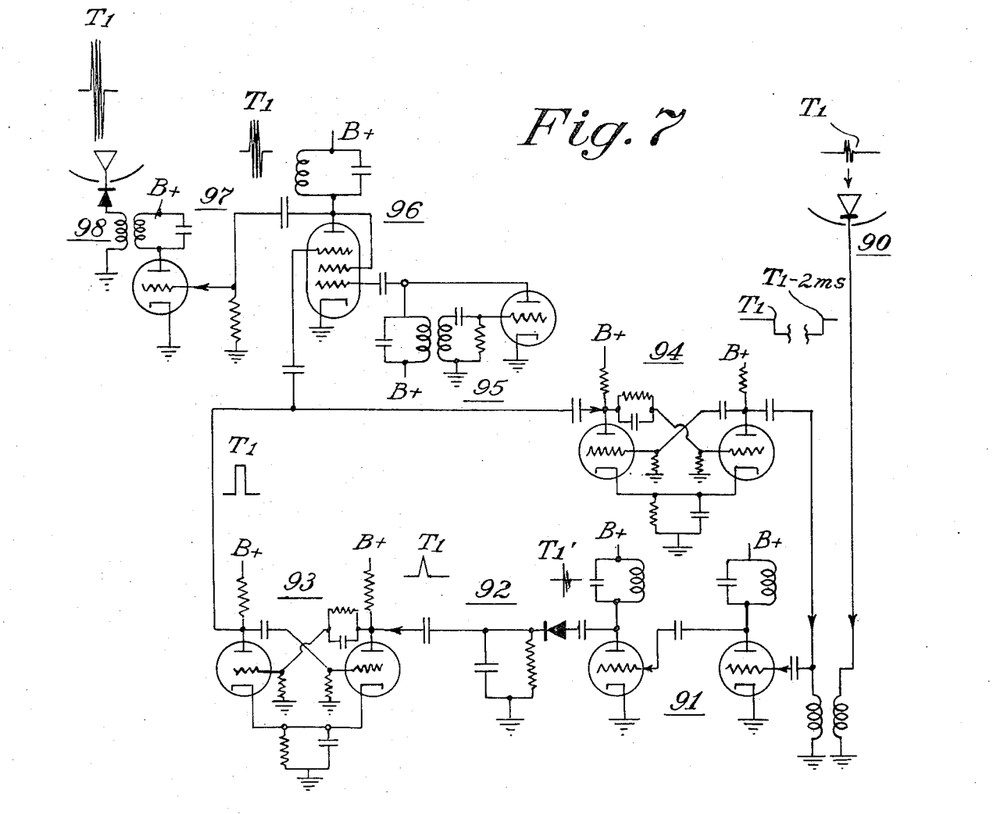

This transponder can use the circuits set forth in FIGS. 3, 4, 4b and 4c of my above patent, which for ease of reading here are given new numeral designations and combined in FIGS. 6 and 7 hereof. The initial or start-of-the-segment pulse from the range transmitter antenna 19a (FIGS. 2Aa and 3a) at position $A_1$ (FIG. 1) is received by the transponder antenna 90, receiver 91, and detector 92 (FIGS. 6 and 7) and triggers a monostable multivibrator 93 to provide a pulse which, together with the output from a stabilized oscillator 95, forms the input to an amplifier 96; and the amplifier output feeds the transmitter 97 which provides the second pulse for the return antenna 98. To prevent spurious triggering of the transponder, the output of the first multivibrator 93 also triggers a second monostable multivibrator 94 which provides a negative gate to deactivate the receiver 91 until a point just before commencement of the next time segment for that range.

In this arrangement, the signal arriving at the shipboard receiver 20 (FIGS. 2Ba and 4a) during the distance interval $T_1$–$T_2$ (FIG. 5B) of the time segment for that range consists of the main transmitter pulse and the "reflected" transponder pulse. By setting the distance clutch 53 (FIGS. 2Ba and 4a) so that the synchronizing circuit 57–57a is "locked" to transponder pulse in this signal, the counter and/or CRT tube will continuously indicate the distance to the transponder station $A_2$ (FIG. 1). By reversely gearing the distance motor 53 to the potentiometer 71 (FIGS. 2Ba and 4a), this distance information can be combined with the angular offset information from the voltage-difference amplifier 70 to provide the necessary input to the offset indicator 72.

In an alternative two-range station arrangement in which the first of the two time-separated "distance" pulses originates at station $A_2$, this first pulse is retransmitted by a transponder at station $A_1$ to the vessel. By setting the distance clutch of motor 53 so that the synchronizing circuit 57, 57a is locked to the transponder pulse, the counter and/or CRT tube will continuously indicate the distance to the transponder station $A_1$. By directly gearing the distance motor 53 to potentiometer 71, the distance information can be combined with the angular offset information from the voltage-difference amplifier 70 to provide the proper input for the offset indicator 72.

Adaptation to the priciple of distance determination by means of a transponder aboard the vehicle as described in my above patent can be accomplished by using the circuits shown in FIGS. 2Aa, 2Ba, 3a and 4a hereof with addition of a transponder, described in FIGS. 6 and 7, both to the shipboard receiver-indicator 20–80 and to the range station transmitter 1–19.

In this arrangement, the transmitter pulse at the beginning of the distance interval $T_1$–$T_2$ (FIG. 5A) in the time segment for that range triggers a reflection from the shipboard transponder, which in turn triggers a reflection from the range station transponder; and the signal arriving at the shipboard receiver 20 (FIGS. 2Ba and 4a) consists of the transmitter pulse and the "twice-reflected" transponder pulse from the range station. By setting the distance clutch 53 so that the synchronizing circuit 57–57a is "locked" to the transponder pulse in this signal, the counter will continuously indicate the distance $y$ to the range station $A_1$ (FIG. 1). By directly gearing the distance motor 53 to the potentiometer 71, this distance information can be combined with the angular offset information from the voltage-difference amplifier 70 to provide the necessary input to the indicator 72 (FIGS. 2Ba and 4a).

This system is particularly suitable for ship navigation, but it can also be used advantageously in the navigation of aircraft and missiles. In these latter cases, the range-station beams will be disposed vertically as well as horizontally about the range center line; and the receiver-indicator will display the vehicle's vertical as well as horizontal offset from this center line.

What is claimed is:

1. A method of determining on board a vehicle its location with respect to a channel range station which comprises:
   radiating from said station along the range center line sequential signals consisting of a radar-transmitter pulse, the resulting radar reflections from all traffic on said range and adjacent-beam pulses,
   on board said vehicle performing the steps of
      receiving the signals from said range station,
      deriving from said signals a radar-reflection pattern for display of the distances of all vehicles on the range from said range station and identifying the reflection from said vehicle,
   measuring the time lapse between the radar-transmitter pulse and said identified reflection precisely to determine said vehicle's distance from said station,
   comparing the amplitude of the adjacent-beam pulses from said station to determine the angular displacement of said vehicle from said range center line, and
   combining said distance and angular displacement information to determine the lateral offset of said vehicle from said range center line.

2. A method of determining on board a vehicle its distance from a channel range station which comprises:
   radiating from said station along the range center line sequential signals consisting of a radar-transmitter pulse and the resulting radar reflections from all traffic on the range,
   on board aid vehicle performing the steps of
      receiving the signals from said range station,
      deriving from said signals a radar-reflection pattern for display of the distances of all vehicles on the range from said range station and identifying the reflection from said vehicle, and
   measuring the time lapse between the radar transmitter pulse and said identified reflection precisely to determine said vehicle's distance from said station.

3. A method of determining on board a vehicle it lateral offset from a channel range center line which comprises:
   radiating from a channel range station along the range center line sequential signals consisting of a radar-transmitter pulse, the resulting radar reflections and adjacent-beam pulses,
   on board said vehicle performing the steps of
      receiving the signals from said range station and identifying its own reflection in the received radar-reflection pattern,
   measuring the time lapse between the radar-transmitter pulse and said identified reflection to determine said vehicle's distance from said station,
   comparing the amplitude of the adjacent-beam pulses from said station to determine the angular displacement of said vehicle from said range center line, and
   combining said distance and angular displacement information to determine the lateral offset of said vehicle from said range center line.

4. A method of determining continuously on board a vehicle as it proceeds along a channel its location with respect to a sequence of two or more channel range stations which comprises:
   radiating in sequence from each of said stations along its respective range center line time-separated signals consisting of a radar-transmitter pulse, the resulting radar reflections of all traffic on that range and adjacent-beam pulses,
   on board said vehicle performing the steps of
      receiving the time-separated signals from the station of the range being traveled,
      deriving from said signals a radar-reflection pattern for display of the distances of all vehicles on the range being traveled from the station of that range and identification of the reflection from said vehicle,
   measuring the time lapse between the radar transmitter pulse and said identified reflection to determine continuously on board said vehicle its precise distance from the station for the range being traveled,
   comparing the amplitude of the adjacent-beam pulses from the station for the range being traveled to determine continuously on board said vehicle its angular displacement from the center line for that range, and
   combining said distance and angular displacement information to determine continuously on board said vehicle its lateral offset from the center line for the range being traveled.

5. A channel-navigation system which comprises:
   one or more radio range stations, each having means of radiating in sequence along its respective range center line time-separated signals consisting of the transmitter pulse and resulting reflection pattern from an attached radar transmitter-receiver oriented along said center line and of equal sustained pulses in two or more beams evenly disposed about said range center line,
   signal receiving means on board a vehicle for receiving said signals from said stations,
   means on board said vehicle responsive to said signals from the station of the range being traveled for deriving from the radar-reflection pattern a display of the distances of all vehicles in said range from said station,
   means on board said vehicle for continuously identifying its own reflection in the radar reflection pattern received from the range station for the range being traveled,
   on board means for determining the time lapse between the radar-transmitter pulse and said identified reflection as a precise measure of the distance of said vehicle from said station,
   on board indicating means responsive to said distance measurement,
   means on board said vehicle for continuously comprising the amplitude of the sustained pulses in the two or more range-station beams evenly disposed about the center line of the range being traveled as a measure of said vehicle's angular displacement from said center line,
   on board indicating means responsive to said angular displacement signals,
   means on board said vehicle for continuously combining said distance and angular displacement information as a measure of the lateral offset of said vehicle from said range center line, and
   on board indicating means responsive to said offset signals.

6. A channel-navigation system which comprises:
   one or more radio range stations, each having means of radiating in sequence along its respective range center line time-separated signals consisting of the transmitter pulse and resulting reflection pattern from an attached radar transmitter-receiver oriented along said range center line,
   signal receiving means on board a vehicle for receiving said signals from said stations,
   means on board said vehicle responsive to said signals from the station of the range being traveled for deriving from the radar-reflection pattern a display of the distances of all vehicles in said range from said station,
   means on board said vehicle for continuously identifying its own reflection in the radar-reflection pattern received from the range station for the range being traveled,
   on-board means for determining the time lapse between the radar-transmitter pulse and said identified reflection as a precise measure of the distance of said vehicle from said station, and on-board indicating means responsive to said distance measurement.

7. A channel-navigation system which comprises:

one or more radio range stations, each having means of radiating in sequence along its respective range center line time-separated signals consisting of the transmitter pulse and resulting reflection pattern from an attached radar transmitter-receiver oriented along said range center line and of equal sustained pulses in two or more beams evenly disposed about said range center line, signal receiving means on board a vehicle for receiving said signals from said stations, means on board said vehicle responsive to said signals from the range being traveled for deriving from the radar-reflection pattern a display of the distances of all vehicles in said range from said station thereof, means on board said vehicle for continuously identifying its own reflection in the radar-reflection pattern received from the range station for the range being traveled, on-board means for measuring the time lapse between the radar-transmitter pulse and said identified reflection as a precise measure of the distance of said vehicle from said station, means on board said vehicle for continuously comparing the amplitude of the sustained pulses in the two or more range-station beams evenly disposed about the center line of the range being traveled as a measure of said vehicle's angular displacement from said center line, means on board said vehicle for continuously combining said distance and angular displacement information as a measure of the lateral offset of said vehicle from said range center line, and on-board indicating means responsive to said offset signals.

8. A method of determining on board a vehicle its location with respect to a channel range station which comprises:

radiating along the range center line from at least one range station and within a time-period characteristic of the range sequential signals comprising a distance-measurement pulse and a resulting reflection pulse, and adjacent-beam bearing measurement pulses of equal amplitude, on board said vehicle performing the steps of
  receiving said sequential signals,
  comparing the amplitudes of the received adjacent-beam bearing measurement pulses to provide angular displacement information,
  measuring the time lapse between the other pulses to provide distance information, and
  combining said distance and angular-displacement information to determine the lateral offset of said vehicle from said range center line.

9. A method as in claim 8 in which said distance-measurement pulse and said adjacent-beam bearing-measurement pulses are transmitted from a fixed station at one end of said range center line, and said reflection pulse is transmitted from a second station at the opposite end of said range center line.

10. A method as in claim 8 in which said reflection pulse and said adjacent-beam bearing-measurement pulses are transmitted from a fixed station at one end of said range center line, and said distance-measurement pulse is transmitted from a second station at the opposite end of said range center line.

11. A method as in claim 8 in which said distance-measurement pulse, a resulting reflection pulse transmitted back from the vehicle, and consecutive adjacent-beam bearing-measurement pulses are transmitted from a single fixed station at one end of said range center line; the on-board steps additionally including the step of retransmitting the distance-measurement pulse back to the fixed station.

12. A system for determining on board a vehicle its location with respect to a channel range station which comprises:

means for radiating along the range center line from at least one range station a repeating sequence of signals, each sequence comprising a distance-measurement pulse, a resulting reflection pulse, and consecutive equal-amplitude adjacent-beam bearing-measurement pulses, on-board means for receiving said sequence of signals, on-board means for comparing the amplitudes of the adjacent-beam bearing-measurement pulses to provide and display angular displacement information, on-board means for measuring the time lapse between the other pulses of the received sequence to provide and display distance information, and on-board means for combining the angular displacement and distance information to determine and display the lateral offset of said vehicle from the range center line.

13. A system as in claim 12 in which there are two range stations respectively at opposite ends of the range, one of said stations transmitting said distance-measurement pulse and the other of said stations having a transponder receiving said distance-measurement pulse and retransmitting it as said resulting reflection pulse, and either of said stations transmitting said adjacent-beam bearing-measurement pulses.

14. A system as in claim 12 having one range station, a transponder at said station and a transponder on board said vehicle, said transponders providing said resulting reflection pulse.

References Cited
UNITED STATES PATENTS

| | | | |
|---|---|---|---|
| 3,157,874 | 11/1964 | Altar et al. | 343—10 X |
| 3,243,812 | 3/1966 | Williams | 343—12 |
| 3,270,345 | 8/1966 | Schauffler | 343—112 |
| 3,302,203 | 1/1967 | Schauffler | 343—112 |

RODNEY D. BENNETT, *Primary Examiner.*

M. F. HUBBER, *Assistant Examiner.*

U.S. Cl. X.R.

343—6.5, 11, 13, 112